United States Patent
Abe et al.

(10) Patent No.: US 10,141,565 B2
(45) Date of Patent: Nov. 27, 2018

(54) NON-AQUEOUS ELECTROLYTE SECONDARY BATTERY COMPRISING SURFACE-COATED POSITIVE ELECTRODE MATERIAL

(75) Inventors: Takeshi Abe, Toyota (JP); Yoshitomo Takebayashi, Toyota (JP); Ippei Toyoshima, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 128 days.

(21) Appl. No.: 14/383,640

(22) PCT Filed: Mar. 9, 2012

(86) PCT No.: PCT/JP2012/056197
§ 371 (c)(1),
(2), (4) Date: Sep. 8, 2014

(87) PCT Pub. No.: WO2013/132663
PCT Pub. Date: Sep. 12, 2013

(65) Prior Publication Data
US 2015/0017536 A1    Jan. 15, 2015

(51) Int. Cl.
*H01M 4/36* (2006.01)
*H01M 4/131* (2010.01)
(Continued)

(52) U.S. Cl.
CPC .......... *H01M 4/366* (2013.01); *H01M 4/131* (2013.01); *H01M 4/483* (2013.01); *H01M 4/502* (2013.01);
(Continued)

(58) Field of Classification Search
CPC ...... H01M 4/131; H01M 4/366; H01M 4/174; H01M 4/5825; H01M 2/1094;
(Continued)

(56) References Cited

U.S. PATENT DOCUMENTS 6,337,158 B1    1/2002  Nakajima et al.
2003/0035999 A1*  2/2003  Gao ................... C01G 23/005
                                                    429/231.1
(Continued)

FOREIGN PATENT DOCUMENTS

JP    2000-235857    8/2000
JP    2001-110417    4/2001
(Continued)

OTHER PUBLICATIONS

"Mg-doped LiNi0.5Mn1.5O4 spinel for cathode materials", Locati et al., Journal of Power Sources, vol. 174, Issue 2, P847-851, Dec. 6, 2007.*

(Continued)

*Primary Examiner* — Kenneth J Douyette
(74) *Attorney, Agent, or Firm* — Finnegan, Henderson, Farabow, Garrett & Dunner, LLP

(57) ABSTRACT

Provided is a non-aqueous electrolyte secondary battery excellent in durability, the non-aqueous electrolyte secondary battery including a positive electrode active material, the surface of which is coated with a film formed of an inorganic solid electrolyte, wherein a change in volume of the positive electrode active material during charge and discharge is reduced to prevent deterioration of the film with which the surface of the positive electrode active material is coated. In a non-aqueous electrolyte secondary battery including a positive electrode active material, the surface of which is coated with a film formed of an inorganic solid electrolyte, the positive electrode active material is a lithium-containing composite oxide having a spinel structure, and contains at least one of Ti and Mg as an additional element.

2 Claims, 3 Drawing Sheets

(51) Int. Cl.
   *H01M 4/48*    (2010.01)
   *H01M 4/50*    (2010.01)
   *H01M 4/505*   (2010.01)
   *H01M 4/525*   (2010.01)
   *H01M 4/52*    (2010.01)
   *H01M 10/42*   (2006.01)
   *H01M 10/052*  (2010.01)
   *H01M 10/0562* (2010.01)
   *H01M 4/02*    (2006.01)
   *H01M 4/485*   (2010.01)

(52) U.S. Cl.
   CPC .......... *H01M 4/505* (2013.01); *H01M 4/523* (2013.01); *H01M 4/525* (2013.01); *H01M 10/4235* (2013.01); *H01M 4/485* (2013.01); *H01M 10/052* (2013.01); *H01M 10/0562* (2013.01); *H01M 2004/028* (2013.01)

(58) Field of Classification Search
   CPC ...... H01M 2/1653; H01M 4/36; H01M 4/983; H01M 4/502; H01M 4/505; H01M 4/523; H01M 4/525
   See application file for complete search history.

(56) References Cited

U.S. PATENT DOCUMENTS

| | | | | |
|---|---|---|---|---|
| 2007/0172730 | A1* | 7/2007 | Iwanaga | H01M 4/131 429/200 |
| 2007/0178384 | A1* | 8/2007 | Kajita | H01M 2/1653 429/251 |
| 2008/0274411 | A1* | 11/2008 | Nakajima | H01M 10/0525 429/322 |
| 2009/0220862 | A1* | 9/2009 | Toyama | H01M 4/366 429/224 |
| 2009/0311587 | A1* | 12/2009 | Best | H01M 4/74 429/127 |
| 2010/0178555 | A1* | 7/2010 | Best | H01M 4/5825 429/188 |
| 2011/0049420 | A1* | 3/2011 | Ellenwood | C01G 53/006 252/182.1 |
| 2011/0104553 | A1* | 5/2011 | Pol | B82Y 30/00 429/156 |
| 2011/0200857 | A1* | 8/2011 | Kaga | H01M 2/1094 429/94 |
| 2011/0305953 | A1* | 12/2011 | Kim | C01G 53/50 429/221 |

FOREIGN PATENT DOCUMENTS

| | | | |
|---|---|---|---|
| JP | 2003-173770 | 6/2003 | |
| JP | 2013-127945 | 6/2013 | |
| WO | WO-2011/020073 A1 * | 2/2011 | .......... H01M 2/1094 |

OTHER PUBLICATIONS

"Surface modification of LiNi0.5Mn1.5O4 by ZrP2O7 and ZrO2 for lithium-ion batteries", Wu et al., Journal of Power Sources, 195, P2909-2913, 2010.*

Kobayashi et al., "5V Class All-Solid-State Composite Lithium Battery with Li3PO4 Coated LiNi0.5Mn1.5O4", Journal of the Electrochemical Society, vol. 150, Issue 12, p. A1577-A1582, Nov. 12, 2003.*

Ting-Fend Yi et al., "Recent Developments in the Doping of $LiNi_{0.5}Mn_{1.5}O_4$ Cathode Material for 5 V Lithium-Ion Batteries," Ionics (2011), vol. 17, pp. 383-389.

R. Alcántara, et al., "Structural and Electrochemical Study of New $LiNi_{0.5}Ti_xMn_{1.5-x}O_4$ Spinel Oxides for 5-V Cathode Materials," Chem. Mater. 2003, vol. 15, No. 12, pp. 2376-2382.

* cited by examiner

NON-AQUEOUS ELECTROLYTE SECONDARY BATTERY COMPRISING SURFACE-COATED POSITIVE ELECTRODE MATERIAL

CROSS-REFERENCE TO RELATED APPLICATIONS

This application is a national phase application of International Application No. PCT/JP2012/56197, filed Mar. 9, 2012, the content of which is incorporated herein by reference.

TECHNICAL FIELD

The present invention relates to a non-aqueous electrolyte secondary battery, and more particularly to a non-aqueous electrolyte secondary battery having a positive electrode active material, the surface of which is coated with a film formed of an inorganic solid electrolyte.

BACKGROUND ART

Conventionally, a technique has been known for producing a non-aqueous electrolyte secondary battery in which a decomposition reaction of an electrolyte solution at a positive electrode in a high-voltage state is suppressed by coating the surface of a positive electrode active material with a lithium ion-conductive glass to reduce a contact area between the positive electrode active material and the electrolyte solution (see Patent Literature 1).

Patent Literature 1 describes in examples a non-aqueous electrolyte battery and a method for producing the non-aqueous electrolyte battery in which a decomposition reaction of an electrolyte solution in a high-voltage state is suppressed by coating positive electrode active material particles and a conductive material with a lithium ion-conductive glass using a sol-gel method after preparing a positive electrode plate including mixture layers containing active materials on both surfaces.

On the other hand, the inventors of the present application have extensively conducted studies on a technique for improving battery characteristics of a non-aqueous electrolyte secondary battery by coating the surface of a positive electrode active material that forms a positive electrode mixture layer with an inorganic solid electrolyte before preparing a positive electrode plate, so that a contact area between the positive electrode active material and an electrolyte solution is reduced to suppress a decomposition reaction of the electrolyte solution at a positive electrode. Specifically, the inventors of the present application have conducted studies on a coating process in which an inorganic solid electrolyte precursor with which the surface of the positive electrode active material is to be coated is prepared, the surface of the positive electrode active material is coated with the inorganic solid electrolyte precursor, and a heat treatment (firing step) is performed for a long time at a high temperature for increasing crystallinity of the coating.

At that time, it has been confirmed that the initial capacity is reduced in a battery produced through the high-temperature/long-time firing step. The inventors of the present application have supposed that the reduction in initial capacity of the battery results from thermal damage to a positive electrode (volatilization of Li), and the inventors have conducted studies on a new coating process that takes the place of the high-temperature/long-time firing step. As a result, the inventors have found a coating process capable of increasing crystallinity of an inorganic solid electrolyte with which the surface of the positive electrode active material is coated, and of reducing thermal damage to the positive electrode, thus enabling to obtain a non-aqueous electrolyte secondary battery having battery characteristics better than those of conventional one. The invention has been already filed (see Japanese Patent Application No. 2011-250025).

CITATION LIST

Patent Literature

Patent Literature 1: JP 2003-173770 A

SUMMARY OF INVENTION

Problems to be Solved by the Invention

However, it has been found that in the non-aqueous electrolyte secondary battery obtained by the above-mentioned invention, a film formed of the inorganic solid electrolyte, with which the surface of the positive electrode active material is coated, deteriorates (e.g., peels) due to expansion and contraction of the positive electrode active material associated with charge and discharge of the battery, and therefore an effect of suppressing a decomposition reaction of the electrolyte solution at the positive electrode is hard to be sustained, so that an effect of improving cycle characteristics as an indication of durability of the battery does not last for a long time. In other words, it has been found that for further improving durability of the battery, a change in volume of the positive electrode active material during the charge and discharge of the battery is required to be reduced.

The present invention has been devised in view of the problems as described above. An object of the present invention is to provide a non-aqueous electrolyte secondary battery excellent in durability, the non-aqueous electrolyte secondary battery including a positive electrode active material, the surface of which is coated with a film formed of an inorganic solid electrolyte, wherein a change in volume of the positive electrode active material during charge and discharge is reduced to prevent deterioration of the film with which the surface of the positive electrode active material is coated.

Means for Solving the Problems

The problems to be solved by the present invention are as described above, and means for solving the problems is described below.

A first aspect of the present invention is a non-aqueous electrolyte secondary battery comprising a positive electrode active material, the surface of which is coated with a film formed of an inorganic solid electrolyte, in which the positive electrode active material is a lithium-containing composite oxide having a spinel structure, and contains at least one of Ti and Mg as an additional element.

Preferably, the lithium-containing composite oxide is represented by the compositional formula: $LiM_xMn_{2-x}O_4$ (M is one or more metal elements selected from the group consisting of Ni, Co, Al, Cr, V, Mg, Zr, Nb, Mo, W, Cu, Zn, Ga, In, Sn, La and Ce; and 0<x<2).

Preferably, the lithium-containing composite oxide is represented by the compositional formula: $LiNi_xMn_{2-x}O_4$ (0<x<2).

Preferably, x satisfies 0.3<x<2.

Preferably, the non-aqueous electrolyte secondary battery operates at an electric potential of 4.5 V or more.

Effects of the Invention

According to the present invention, by using as a positive electrode active material a lithium-containing composite oxide having a spinel structure, the lithium-containing composite oxide containing Ti and/or Mg, a change in volume of the positive electrode active material during charge and discharge can be reduced, and consequently deterioration of a film can be suppressed.

DESCRIPTION OF EMBODIMENTS

Figure 1:
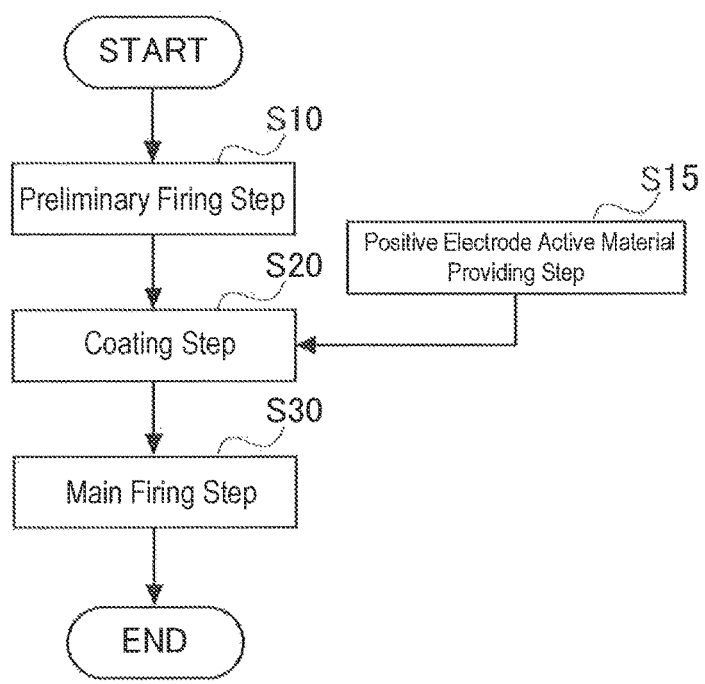
FIG. 1 shows a flow of a method for producing a non-aqueous electrolyte secondary battery according to an embodiment of the present invention.

An embodiment of the present invention is described below.

First, a configuration of a non-aqueous electrolyte secondary battery as an embodiment of the present invention is described. The non-aqueous electrolyte secondary battery according to the present embodiment is a lithium ion secondary battery including a positive electrode active material, the surface of which is coated with a film formed of an inorganic solid electrolyte.

[Non-aqueous Electrolyte Secondary Battery]

For example, the lithium ion secondary battery is configured as a cylindrical battery, a box-type battery, a laminate-type battery or the like which is formed by housing in a battery container an electrode body including sheet-shaped positive electrode and negative electrode in a superimposed or wound state. Specifically, the lithium ion secondary battery is produced in the following manner sheet-shaped positive electrode and negative electrode are superimposed or wound with a separator interposed therebetween, and laminated to form an electrode body, an electrolyte solution having lithium ion conductivity is poured with the electrode body housed in a battery container, and the battery container is tightly sealed. The lithium ion secondary battery produced in this manner includes an electrode body having a positive electrode, a negative electrode and a separator, and a battery container holding the electrode body. A non-aqueous electrolyte solution is used as the electrolyte solution.

The positive electrode is produced through an application step for applying a positive electrode mixture, which is prepared in the form of a paste by mixing electrode materials such as a conductive material, a binding agent and a thickener with a positive electrode active material capable of absorbing and desorbing lithium ions using a dispersion solvent, to the surface of a sheet-shaped current collector formed of an aluminum foil or the like; a drying step for drying the current collector to which the positive electrode mixture is applied; and a roll pressing step for increasing the density of the positive electrode active material by pressing the current collector with the positive electrode mixture dried in the drying step.

As the dispersion solvent, an organic solvent such as N-methyl-2-pyrrolidone (NMP), dimethylformamide (DMF) or dimethylacetamide (DMA) can be used.

As the positive electrode active material, a lithium-containing composite oxide having a spinel structure can be used. The spinel structure is preferably one belonging to a cubic crystal structure or a tetragonal crystal structure. By forming a spinel structure, structural stability is secured in the positive electrode active material. As the lithium-containing composite oxide having a spinel structure, for example, a cobalt lithium composite oxide ($LiCoO_2$), a nickel lithium composite oxide ($LiNiO_2$), a manganese lithium composite oxide ($LiMn_2O_4$) or what is called a binary lithium-containing composite oxide containing two of transition metal elements and/or typical metal elements. Alternatively, a ternary lithium-containing composite oxide containing three of transition metal elements and/or typical metal elements can be used. The lithium-containing composite oxide is preferably one represented by the compositional formula: $LiM_xMn_{2-x}O_4$ (M is one or more metal elements selected from the group consisting of Ni, Co, Al, Cr, V, Mg, Zr, Nb, Mo, W, Cu, Zn, Ga, In, Sn, La and Ce; and $0<x<2$). The lithium-containing composite oxide is preferably a binary lithium transition metal composite oxide containing two transition metal elements: nickel and manganese, which is represented by $LiNi_xMn_{2-x}O_4$ ($0<x<2$) where the metal element M in the compositional formula: $LiM_xMn_{2-x}O_4$ is replaced by Ni. As the lithium-containing composite oxide having a spinel structure, a positive electrode active material that performs charge and discharge at an electric potential of 4.5 V or more with respect to the lithium metal, and for example, a binary lithium transition metal composite oxide containing nickel and manganese, which is represented by $LiNi_xMn_{2-x}O_4$, is preferred.

When a high-potential-type positive electrode active material that performs charge and discharge at an electric potential of 4.5 V or more is used, a change in volume of the positive electrode active material during charge and discharge is increased, so that the effect of the present invention is markedly obtained. That is, in a lithium ion secondary battery that operates at an electric potential of 4.5 V or more as shown in examples described later, the effect of the present invention is markedly obtained.

As the positive electrode active material, one containing at least one of Ti (titanium) and Mg (magnesium) as an additional element is used. Specifically, the lithium-containing composite oxide having a spinel structure, which is selected as a positive electrode active material, contains, in addition to a lithium-containing composite oxide having lithium and at least one metal element as main component metal elements (e.g., the above-described cobalt lithium composite oxide ($LiCoO_2$)), at least one transition metal element (i.e., a transition metal element different from the main component metal elements) at a molar ratio lower than that of each of the main component metal elements (in the case of $LiNi_xMn_{2-x}O_4$, for example, a ratio lower than the molar ratio of each of Li, Ni and Mn shown in the compositional formula). That is, the additional element is not included as a main component metal element that forms a main component in the lithium-containing composite oxide, but is included as a constituent metal element of the lithium-containing composite oxide at a ratio lower than that of the main component metal element. In the present embodiment, the lithium-containing composite oxide contains one or two selected from Ti and Mg at a ratio lower than that of the main component metal element.

The lithium-containing composite oxide having a spinel structure can be prepared by a conventionally known method. The lithium-containing composite oxide can be prepared by, for example, a solid phase method, a melt impregnation method, a spray drying method (spray combustion method), a hydrothermal synthesis method, an ion exchange method, a liquid phase method, or the like. In the case of the most common solid phase method, for example, a fired product formed of predetermined constituent elements of a positive electrode active material can be obtained by mixing raw material compounds (starting materials), which are selected as constituent elements of the positive electrode active material, at a predetermined molar ratio to prepare a mixture, and firing the mixture using predetermined appropriate means. That is, in the case of the solid phase method, as a method for containing the additional element (hereinafter, also referred to as a dope), a raw material compound (a raw material compound containing an additional element as a composition) selected as a minor component metal element in constituent elements of the positive electrode active material may be added at a predetermined molar ratio and mixed together with raw material compounds selected as main component metal elements in constituent elements of the positive electrode active material at the time of preparing a mixture formed of predetermined constituent elements of the positive electrode active material as described above. After a fired product formed of a lithium-containing composite oxide containing an additional element is thus obtained, the fired product is ground, granulated and classified, whereby a powder of a lithium-containing composite oxide containing additional-element particles formed as secondary particles, which have predetermined average particle size, particle size distribution, bulk density and the like, can be obtained. The lithium-containing composite oxide powder having an additional element can be confirmed to have a spinel structure by X-ray powder diffraction. The surface of the thus obtained lithium-containing composite oxide (positive electrode active material) containing an additional element is coated with a film (hereinafter, also referred to a coat layer) formed of an inorganic solid electrolyte.

The method for containing an additional element in a positive electrode active material is not limited to the above-mentioned solid phase method. For example, the positive electrode active material may be prepared so that an additional element (at least one of Ti (titanium) and Mg (magnesium)) is contained as a minor component metal element in constituent elements of the positive electrode active material using a conventionally known method as long as constituent elements of the positive electrode active material include the additional element.

The phrase "an additional element is contained in a positive electrode active material" means that a main component metal element in constituent elements of the positive electrode active material is partially element-substituted with a minor component metal element (additional element) in an amount smaller than that of the main component metal element.

A crystal structure (e.g., lattice constant), one of physical properties of the positive electrode active material (lithium-containing composite oxide), can be determined by measuring a powder of the positive electrode active material (lithium-containing composite oxide) by an X-ray diffraction method (hereinafter, referred to as XRD measurement) and obtaining a lattice constant (c axis length) from the obtained crystal structural parameter.

The conductive material is intended for securing electrical conductivity of the positive electrode. As the conductive material, powders of carbon substances such as natural graphite, artificial graphite, acetylene black (AB) and carbon black can be used.

The binding agent (binder) serves to anchor particles of the positive electrode active material, particles of the conductive material and the like, and a fluorine-containing resin such as polytetrafluoroethylene (PTFE), polyvinylidene fluoride (PVDF), a styrene-butadiene copolymer (SBR) or fluororubber, or a thermosetting resin such as polypropylene can be used as the binding agent.

The thickener is intended to impart viscosity to a positive electrode active material paste (paste-like positive electrode mixture) and a negative electrode active material paste (paste-like negative electrode mixture). As the thickener, for example, polyethylene oxide (PEO), polyvinyl alcohol (PVA), carboxymethyl cellulose (CMC) or the like is used.

The thickener is used when it is desired to impart viscosity to a positive electrode active material paste and a negative electrode active material paste, and may be appropriately used as necessary.

The negative electrode is not particularly limited as long as a negative electrode active material having characteristics such that lithium ions are absorbed during charge and released during discharge can be used. Examples of the material having such characteristics include lithium metals and carbon materials such as graphite and amorphous carbon. Among them, a carbon material that causes a relatively large voltage change along with charge and discharge of lithium ions is preferably used, and a carbon material formed of natural graphite or artificial graphite having high crystallinity is more preferably used. Particles of the negative electrode active material are anchored using the binding agent.

The separator is intended for electrically insulating the positive electrode and the negative electrode to hold a non-aqueous electrolyte solution. Examples of the material that forms the separator include a porous synthetic resin film, particularly a porous film of a polyolefin-based polymer (polyethylene, polypropylene).

As the electrolyte solution, a solution obtained by dissolving a lithium salt such as $LiPF_6$, $LiClO_4$ or $LiBF_4$ as a support electrolyte in a mixed organic solvent of a cyclic carbonate such as ethylene carbonate (EC), propylene carbonate (PC) or vinylene carbonate (VC) and a linear carbonate such as dimethyl carbonate (DMC), diethyl carbonate (DEC) or ethylmethyl carbonate (EMC) can be used.

A positive electrode and a negative electrode each having the above-mentioned configuration are superimposed or wound, etc. with a separator superimposed therebetween to form an electrode body, connection is established from the positive electrode and the negative electrode to a positive electrode terminal and a negative electrode terminal each communicating with the outside, the electrode body is placed in an appropriate battery container (a housing made of a metal or a resin, a bag formed of a laminate film made of a metal such as aluminum, or the like), and a non-aqueous electrolyte solution is poured between the positive electrode and the negative electrode and the battery container is tightly sealed to thereby form a lithium ion secondary battery.

A method for producing a non-aqueous electrolyte secondary battery as an embodiment of the present invention is now described with reference to FIG. 1.

[Method for Producing Non-aqueous Electrolyte Secondary Battery]

The method for producing a non-aqueous electrolyte secondary battery is a method for producing a non-aqueous electrolyte secondary battery including a positive electrode active material, the surface of which is coated with a film formed of an inorganic solid electrolyte, the method including: positive electrode active material providing step S15 of providing in advance a positive electrode active material to be used in production of a positive electrode of a lithium ion secondary battery; and a film forming step for coating the surface of the provided positive electrode active material with an inorganic solid electrolyte to form a film formed of an inorganic solid electrolyte on the surface of the positive electrode active material. Specifically, as shown in FIG. 1, the method for producing a non-aqueous electrolyte secondary battery includes positive electrode active material providing step S15, and preliminary firing step S10, coating step S20 and main firing step S30 as the film forming step. The respective steps are described in detail below.

Positive electrode active material providing step S15 is a step for providing a positive electrode active material in which a lithium-containing composite oxide (positive electrode active material) having a spinel structure contains at least one of Ti and Mg as an additional element as described above. That is, in positive electrode active material providing step S15, a positive electrode active material (lithium-containing composite oxide) containing (doped with) one or more selected from Ti and Mg as an additional element and having a spinel structure is prepared by a conventionally known method, and provided as a positive electrode active material to be used in coating step S20. A positive electrode active material (lithium-containing composite oxide) containing at least one of Ti (titanium) and Mg (magnesium), which is provided in positive electrode active material providing step S15, is used in coating step S20.

Preliminary firing step S10 is a step for preliminarily firing an inorganic solid electrolyte precursor at a temperature lower than the glass transition temperature of the inorganic solid electrolyte. Specifically, in preliminary firing step S10, an inorganic solid electrolyte precursor is preliminarily fired at a temperature lower than the glass transition temperature of the inorganic solid electrolyte for preparing a glassy inorganic solid electrolyte material as a coat material (coating material) of the positive electrode active material.

Here, the inorganic solid electrolyte precursor refers to a mixture of raw materials of the inorganic solid electrolyte, which is a raw material mixture in the state of a solid phase or a liquid phase (solution). From preliminary firing step S10, a glassy (amorphous) inorganic solid electrolyte material, the crystallinity (ion conductivity) of which is increased in advance, can be obtained as a glassy coat material for coating the surface of the positive electrode active material, which is used in coating step S20. That is, preliminary firing step S10 is a step for preliminarily firing an inorganic solid electrolyte precursor to prepare a glassy inorganic solid electrolyte material (glassy coat material) which is not crystallized but has a certain degree of crystallinity.

The glass transition temperature of the inorganic solid electrolyte in preliminary firing step S10 provides a threshold for setting a firing temperature at the time of preliminary firing in preliminary firing step S10, and is a temperature providing an indication for obtaining an inorganic solid electrolyte precursor as a glassy coat material (glassy inorganic solid electrolyte material) by preliminarily firing the inorganic solid electrolyte precursor at a temperature lower than the glass transition temperature. That is, when the inorganic solid electrolyte precursor is fired at a temperature lower than the glass transition temperature of the inorganic solid electrolyte with which the positive electrode active material is to be coated, a glassy inorganic solid electrolyte material can be formed because the inorganic solid electrolyte precursor is kept glassy (amorphous) without being not crystallized although crystallinity is increased by thermal energy from firing.

The firing temperature in preliminary firing step S10 may be any temperature that is lower than the glass transition temperature, does not cause the inorganic solid electrolyte precursor to be crystallized, and is capable of giving a predetermined thermal history. Specifically, in view of achieving the purpose of preliminary firing step S10 to obtain a glassy coat material, the crystallinity of which is increased in advance, it is preferred that the firing temperature in preliminary firing step S10 is set to a temperature that is equal to or higher than a temperature lower approximately 20° C. than the glass transition temperature and lower than the glass transition temperature, and it is more preferred that firing is performed at a temperature that is lower than the glass transition temperature and as close as possible to the glass transition temperature.

As the organic solid electrolyte with which the positive electrode active material is to be coated, one that has oxidation resistance exceeding the oxidation-reduction potential of the positive electrode active material and has ion conductivity is suitable. As the inorganic solid electrolyte, an oxide-based inorganic solid electrolyte, a sulfide-based inorganic solid electrolyte or the like can be used. Examples of the oxide-based inorganic solid electrolyte include $Li_{1+x}Al_xGe_{2-x}(PO_4)_3$, more specifically $Li_{1.5}Al_{0.5}Ge_{1.5}(PO_4)_3$.

In the present embodiment, the inorganic solid electrolyte is not limited to those described above. For example, other inorganic solid electrolytes having lithium ion conductivity, and inorganic solid electrolytes having conductivity of ions other than lithium ions can be used.

While the method for preparing an inorganic solid electrolyte material as the glassy coat material is not particularly limited, examples thereof include a solid phase method, a liquid phase method and a gas phase method. For example, the material is synthesized by a gas phase method such as a chemical gas phase synthesis method or a physical gas phase synthesis method using a raw material solution containing constituent elements of $Li_{1.5}Al_{0.5}Ge_{1.5}(PO_4)_3$. Specifically, by spraying a raw material solution, which contains a lithium compound as a lithium source, an aluminum compound as an aluminum source, a germanium compound as a germanium source and a phosphorus compound as a phosphorus source, into a chamber that serves as a high-temperature reaction field by a plasma or a burner, together with an oxygen gas (reaction gas), oxide particles represented by $Li_{1.5}Al_{0.5}Ge_{1.5}(PO_4)_3$[LAGP] can be generated (Flash Creation method: hereinafter referred to as FCM). For production of the glassy coat material by FCM, for example, NANOCREATOR manufactured by Hosokawa Micron Corporation can be used.

Coating step S20 is a step for coating the surface of the positive electrode active material provided in positive electrode active material providing step S15 with the inorganic solid electrolyte precursor preliminarily fired in preliminary firing step S10. That is, coating step S20 is a step for coating the surface of the positive electrode active material with a glassy inorganic solid electrolyte material, i.e., the glassy coat material obtained in preliminary firing step S10. The coating method applied at the time of coating the surface of the positive electrode active material in coating step S20 is not particularly limited, but as a specific example, a solid phase reaction is used to coat the surface of the positive electrode active material with the glassy inorganic solid electrolyte material obtained as a glass coat material in preliminary firing step S10. More specifically, in coating step S20, for example, predetermined positive electrode active material and glassy coat material are mixed at a predetermined ratio, and the mixture is put in a predetermined coating apparatus to form a coat layer of the glassy coat material on the surface of the positive electrode active material. The coating apparatus is an apparatus that coats the surface of the positive electrode active material by means of collision energy between particles using a centrifugal force during rotation.

In coating step S20, only at least a part of the surface of the positive electrode active material may be coated with the glassy coat material.

Thus, in coating step S20, the surface of the positive electrode active material provided in positive electrode active material producing step S15 is coated with the inorganic solid electrolyte material obtained in preliminary firing step S10, so that a film formed of the inorganic solid electrolyte material is formed on the surface of the positive electrode active material.

Positive electrode active material providing step S15 is a preceding step for providing a positive electrode active material to be used in coating step S20, and may be therefore performed as a stage before coating step S20.

Main firing step S30 is a step for subjecting the positive electrode active material to main firing at a temperature equal to or higher than the glass transition temperature after coating step 20. That is, in main firing step S30, a positive electrode active material (a composite material formed of a glassy coat material and positive electrode active material), the surface of which is coated with a film formed of a glassy inorganic solid electrolyte as a glassy coat material, is subjected to main firing at a temperature equal to or higher than the glass transition temperature of the inorganic solid electrolyte. Specifically, in main firing step S30, a positive electrode active material, the surface of which is coated with a glassy coat material as a film, is fired at a predetermined temperature equal to or higher than the glass transition temperature for a predetermined firing time to further improve crystallinity of the glassy coat material as the film or crystallize the glassy coat material. That is, main firing step S30 is a step for heat-treating (firing) a positive electrode active material coated with a glassy inorganic solid electrolyte material (glassy coat material), so that crystallinity of the glassy coat material with which the surface of the positive electrode active material is coated is improved or the glassy coat material is crystallized, to prepare a positive electrode active material provided with a coat layer formed of a crystalline inorganic solid electrode. By main firing step S30, crystallinity (ion conductivity) of the glassy coat material with which the surface of the positive electrode active material is coated can be increased to a desired level. Crystallinity of the inorganic solid electrolyte material is increased in advance in preliminary firing step S10, and therefore in main firing step S30, crystallinity of the inorganic solid electrolyte material can be increased to a desired level in a shorter time than conventional one. In the course of firing in main firing step S30, an interface between the positive electrode active material and the coat layer (inorganic solid electrolyte material) is sintered, so that high adhesive strength can be secured. When at least a part of the surface of the positive electrode active material is coated with a coat layer, the electric potential at the interface between the positive electrode and electrolyte decreases due to existence of the coat layer, so that the effect of suppressing oxidization and decomposition of the electrolyte solution can be maintained for a longer period of time than conventional one.

The present invention is now described with reference to examples and comparative examples. Specifically, evaluation batteries were experimentally prepared using a positive electrode active material prepared in accordance with the above-described method for producing a non-aqueous electrolyte secondary battery, and battery characteristics of the evaluation batteries were evaluated.

The evaluation batteries in examples and comparative examples shown below are produced in accordance with the above-described method for producing a non-aqueous electrolyte secondary battery, but they are mutually different in terms of presence and absence of an additional element and a type thereof.

<Selection of Positive Electrode Active Material (Main Component Metal Element)>

As the positive electrode active material to be used in examples and comparative examples, $LiNi_{0.5}Mn_{1.5}O_4$, a binary lithium transition metal composite oxide having a spinel structure and containing nickel and manganese, was selected.

<Selection of Inorganic Solid Electrolyte>

As the inorganic solid electrolyte to be used in examples and comparative examples, $Li_{1.5}Al_{0.5}Ge_{1.5}(PO_4)_3$ was selected.

<Provision of Positive Electrode Active Material>

As different elements (additional elements) different from the main component metal element with which $LiNi_{0.5}Mn_{1.5}O_4$ was to be doped, Fe (iron), Ti (titanium) and Mg (magnesium) were selected, and three positive electrode active materials each doped with each of these different elements at a ratio of 0.1 mol % to $LiNi_{0.5}Mn_{1.5}O_4$ were used.

In the $LiNi_{0.5}Mn_{1.5}O_4$, Ni and/or Mg is partially element-substituted with each different element (additional element).

<Provision of Glassy Coat Material>

The glassy coat material was synthesized by the foregoing FCM using NANOCREATOR manufactured by Hosokawa Micron Corporation. As raw materials to be used for synthesis of the glassy coat material, the following materials were used.

Li source: Lithium naphthenate solution (Li concentration: 1.2 wt %)

Al source: Ethyl-acetoacetate-aluminum-di-n-butyrate solution (Al concentration: 5.8 wt %)

Ge source: Germanium-dissolved mineral spirit solution (Ge concentration: 9.8 wt %)

P source: Di-ethyl-phosphonoacetic acid (P concentration: 13.4 wt %)

The raw materials were mixed at a predetermined ratio to prepare a precursor solution. The precursor solution was preliminarily fired under conditions of an $O_2$ flow rate of 30 L/min and a chamber internal pressure of $10^4$ Pa by FCM to obtain a glassy coat material (a precursor of a crystalline coat material).

<Confirmation of Glassy Coat Material>

Figure 2:
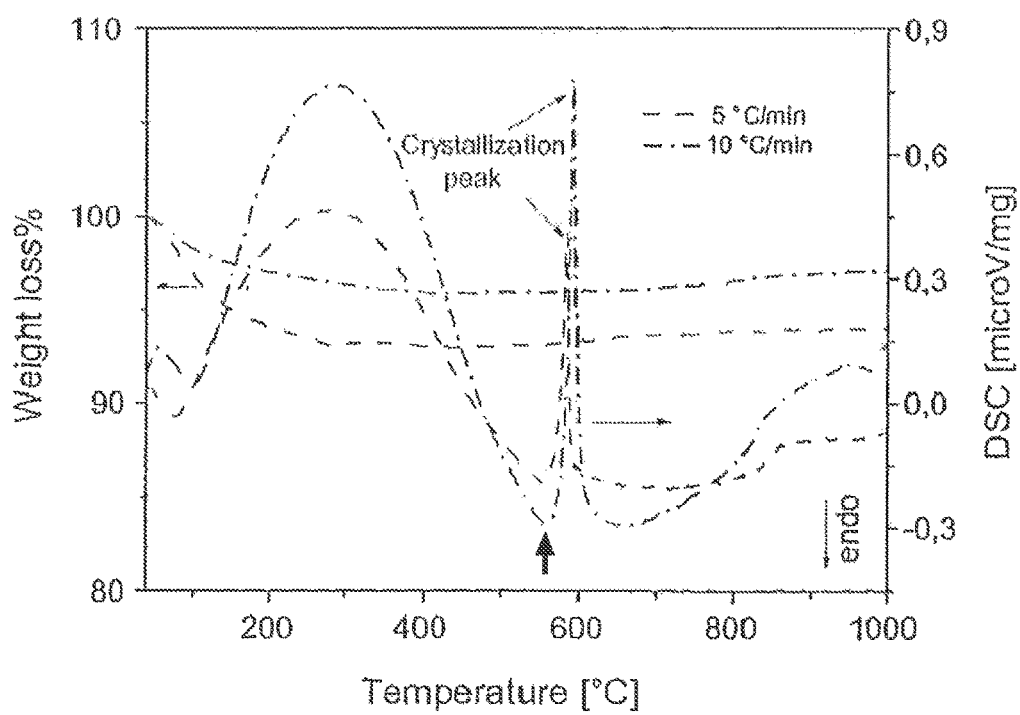
FIG. 2 shows results of TGA-DSC measurement of a glassy coat material.

It can be confirmed by TGA-DSC measurement or the like that the coat material obtained by FCM is glassy. Results of TGA-DSC measurement of this coat material are shown in FIG. 2. The measurement was performed at a temperature elevation rate of 5° C./min and 10° C./min under a $N_2$ atmosphere. As shown in FIG. 2, an exothermic peak associated with crystallization (crystallization peak) was observed at around 590° C., so that this coat material could be confirmed to be glassy.

In the TGA-DSC measurement results shown in FIG. 2, there is a glass transition temperature between 500° C. and 590° C. (endothermic part shown by the upward arrow in FIG. 2). Of course, the glass transition temperature of a material generally varies depending on a type of the material, and measurement conditions for measurement of a temperature elevation rate, and the like in a measurement apparatus, and therefore when a glass transition temperature is used as a threshold at the time of setting a firing temperature in preliminary firing step S10 and main firing step S30 as in the present embodiment, it is necessary to determine a glass transition temperature considering a type of the material and measurement conditions.

In the present embodiment, since a glassy coat material was obtained using FCM, it was necessary to confirm that the glassy coat material obtained using FCM was formed at a temperature lower than the glass transition temperature by performing TGA-DSC measurement to check whether the coat material was in a glassy state, but when preliminary firing is performed by firing means not depending on FCM (e.g., an electric furnace in which a firing temperature can be set), preliminary firing conditions (firing temperature and firing time) may be set based on a glass transition temperature measured in advance.

<Provision of Positive Electrode Active Material Coated with Glassy Coat Material>

The surface of a positive electrode active material is coated with a glassy coat material by adding a glassy coat material at a predetermined ratio (1.5 wt % in the present embodiment) to each of a positive electrode active material powder not doped with an additional element and positive electrode active material powders doped with Fe (iron), Ti (titanium) and Mg (magnesium), respectively, and performing powder mixing, and loading the resulting mixture in a coating apparatus. This apparatus performs coating by means of collision energy between particles using a centrifugal force during rotation. Coating was performed under conditions of 5000 rpm-30 minutes. The positive electrode active materials, the surface of which was coated with a glassy coat material as a film by the coating, were each fired in the air at 850° C. for 2 hours to obtain four positive electrode materials provided with a film formed of a high-crystallinity inorganic solid electrolyte. For conveniently discriminating preparation conditions (presence and absence of a dope; and a type and a blending ratio of an additional element when a dope is present) for the four positive electrode materials obtained by subjecting the positive electrode active materials to a coating treatment with an inorganic solid electrolyte in the manner described above, hereinafter the preparation condition for a positive electrode material not containing an additional element is referred to as "no dope", the preparation condition for a positive electrode material containing 0.1 mol % of Fe as an additional element is referred to as "Fe 0.1 mol % dope", the preparation condition for a positive electrode material containing 0.1 mol % of Ti as an additional element is referred to as "Ti 0.1 mol % dope" and the preparation condition for a positive electrode material containing 0.1 mol % of Mg as an additional element is referred to as "Mg 0.1 mol % dope".

COMPARATIVE EXAMPLE 1

Preparation of Positive Electrode

A positive electrode material prepared under the "no dope" condition, AB (acetylene black) as a conductive aid and PVDF (polyvinylidene fluoride) as a binding agent (binder) were mixed at a ratio of positive electrode material/AB/PVDF=87/10/3 (wt %) with NMP (N-methylpyrrolidone) as a dispersion medium to prepare a paste for a positive electrode, the paste was applied onto an aluminum foil and dried, and the resultant was then drawn out in the form of a sheet by a roll press to obtain an electrode for a positive electrode.

Preparation of Negative Electrode

For a negative electrode active material, natural graphite (average particle size $D_{50}$: 20 μm; BET specific surface area 4 m$^2$/g) was used. A graphite material, a styrene-butadiene copolymer (SBR) as a binding agent, and carboxymethyl cellulose (CMC) as a thickener were mixed at a ratio of graphite/SBR/CMC=98/1/1 (wt %) with water as a dispersion medium to prepare a paste for a negative electrode, the paste was applied onto a copper foil and dried, and the resultant was then drawn out in the form of a sheet by a roll press to obtain an electrode for a negative electrode. At this time, the applied amount was adjusted so that the ratio of a theoretical capacity of the positive electrode to a theoretical capacity of the negative electrode was 1:1.5.

The electrode sizes of the foregoing positive electrode and negative electrode were adjusted so that the design capacity of the battery was 60 mAh, the positive electrode and the negative electrode were then made to face each other with a separator interposed therebetween to form an electrode body, and the electrode body was sealed together with an electrolyte solution (1.0 M $LiPF_6$ EC/EMC=30/70 (vol.%)) by lamination to obtain a laminate type lithium ion secondary battery, so that an evaluation battery of Comparative Example 1 was prepared.

The evaluation battery operates at an electric potential of 4.5 V or more in view of the type of the positive electrode active material used.

COMPARATIVE EXAMPLE 2

An evaluation battery of Comparative Example 2 was prepared in the same manner as in Comparative Example 1 except that a positive electrode material prepared under the "Fe 0.1 mol % dope" condition was used in place of the positive electrode material prepared under the "no dope" condition in preparation of the positive electrode in Comparative Example 1.

EXAMPLE 1

An evaluation battery of Example 1 was prepared in the same manner as in Comparative Example 1 except that a positive electrode material prepared under the "Ti 0.1 mol % dope" condition was used in place of the positive electrode material of "no dope" in preparation of the positive electrode in Comparative Example 1.

EXAMPLE 2

An evaluation battery of Example 2 was prepared in the same manner as in Comparative Example 1 except that a positive electrode material prepared under the "Mg 0.1 mol % dope" condition was used in place of the positive electrode material of "no dope" in preparation of the positive electrode in Comparative Example 1.

Battery preparation conditions for the evaluation batteries of comparative examples and examples prepared in the manner described above are different in terms of presence and absence of an additional element added to the positive electrode active material and a type of the additional element.

Subsequently, battery characteristics of each evaluation battery prepared in the manner described above were evaluated. Specifically, measurement of an initial capacity, determination of a change in lattice constant and evaluation of cycle characteristics in each evaluation battery were performed. Hereinafter, methods for measurement of an initial capacity, determination of a change in lattice constant and evaluation of cycle characteristics are described.

[Measurement of Initial Capacity]

With the charge current fitted to a constant current-constant voltage method, each evaluation battery was charged to 4.9 V at a constant current with a current value of ⅕ C, and charged at a constant voltage to a point where the current value at constant voltage charge was 1/50 C, so that the battery was brought into a full charge state. Thereafter, the battery was discharged to 3.5 V with a current value of ⅕ C in accordance with a constant current method, and the capacity at this time was defined as an initial capacity. The foregoing operations were all performed under an environment of 25° C.

[Confirmation of Change in Lattice Constant]

In the evaluation battery of each of comparative examples and examples, each of batteries with a SOC (State of Charge) of 0% and a SOC (State of Charge) of 100% was disassembled to take out a positive electrode, and a lattice constant of each positive electrode active material was calculated from a result of XRD measurement. An amount of change between a volume at a SOC of 0% and a volume at a SOC of 100% was divided by a volume at a SOC of 0% to calculate a volume change rate of the positive electrode.

The results are shown in Table 1. In all of the positive electrode active materials, the volume was changed with charge, but one doped with 0.1 mol % of Fe ("Fe 0.1 mol dope" shown in Table 1) had a volume change comparable to the volume change of one that was not doped ("no dope" shown in Table 1), whereas one doped with 0.1 mol % of Ti and one doped with 0.1 mol % of Mg ("Ti 0.1 mol % dope" and "Mg 0.1 mol % dope" shown in Table 1) showed a volume change smaller than the volume change of "no dope" one. Thus, the volume change was not necessarily reduced by doping of any additional element (different element), but the volume change tended to be reduced by doping of a specific additional element (Ti and Mg in the present embodiment).

TABLE 1

Summary of Volume Change

| Experiment level | Volume change/% |
| --- | --- |
| No dope | 6.01 |
| Fe 0.1 mol % dope | 6.04 |
| Ti 0.1 mol % dope | 5.48 |
| Mg 0.1 mol % dope | 4.95 |

[Evaluation of Cycle Characteristics]

The evaluation battery of each of comparative examples and examples was charged to 4.9 V at a constant current with a current density of 2 C and then discharged to 3.5 V with the same current density at an environment temperature of 60° C. With this charge and discharge cycle defined as one cycle, 200 cycles were conducted. Thereafter, a discharge capacity was measured in the same manner as in the case of the initial capacity, and the measured discharge capacity was defined as a discharge capacity after cycles. The discharge capacity after cycles was divided by the initial capacity to calculate a capacity retention rate [%]. In this manner, a cycle test was conducted using the evaluation battery of each of Comparative Examples 1 and 2 and Examples 1 and 2.

<Confirmation of Effect of Invention>

A summary of cycle characteristics in the evaluation batteries of Comparative Examples 1 and 2 and Examples 1 and 2 is shown in Table 2.

TABLE 2

Summary of Results of Cycle Characteristics

| Experiment level | Positive electrode active material | Volume change/% | Cycle capacity retention rate |
| --- | --- | --- | --- |
| Comparative Example 1 | No dope | 6.01 | 10.0% |
| Comparative Example 2 | Fe 0.1 mol % dope | 6.04 | 10.6% |
| Example 1 | Ti 0.1 mol % dope | 5.48 | 23.8% |
| Example 2 | Mg 0.1 mol % dope | 4.95 | 26.1% |

(Relationship Between Volume Change and Cycle Characteristics)

It is apparent that Comparative Examples 1 and 2 which are comparable in volume change with charge and discharge have comparable capacity retention rates each being approximately 10%, whereas in Examples 1 and 2 which have a small volume change, the capacity retention rate is approximately 24 to 26%, and is significantly improved as compared to Comparative Examples 1 and 2. This is thought to be because due to a decrease in volume change with charge and discharge, peeling and rupture of a film with which the surface of a positive electrode active material is coated is suppressed, so that durability is significantly improved.

The content of an additional element is not limited to 0.1 mol % as in the present embodiment. The content of an additional element is preferably 0.3 mol % or less for ensuring that at least the effect of the present invention is obtained, and battery characteristics other than cycle characteristics are not affected. That is, when the content of an additional element is 0.3 mol % or less, a preferred range of x in the above compositional formula: $LiM_xMn_{2-x}O_4$ is 0.3<x<2 because the lithium-containing composite oxide contains an additional element at a ratio lower than the molar ratio of each main component metal element. Similarly, a preferred range of x in the above compositional formula: $LiNi_xMn_{2-x}O_4$ is 0.3<x<2.

Thus, according to the present invention, by using as a positive electrode active material a lithium-containing composite oxide having a spinel structure, the lithium-containing composite oxide containing Ti or Mg or both, a change in volume of the positive electrode active material during charge and discharge can be reduced, so that deterioration of a film on the surface of a positive electrode active material can be suppressed.

In the present invention, a lithium-containing composite oxide having a spinel structure (e.g., $LiNi_{0.5}Mn_{1.5}O_4$), the surface of which is at least partially coated with a film formed of an inorganic solid electrolyte, is doped with a different element as an additional element, which reduces a change in lattice constant with charge, so that a change in volume of a positive electrode with charge and discharge can be suppressed to prevent peeling and rupture of a film which results from the volume change. The film with which the surface of the positive electrode active material is coated is hereby prevented from losing a function as a coating layer to suppress oxidation and decomposition of an electrolyte, so that a lithium ion secondary battery excellent in durability can be provided.

In the lithium ion secondary battery of the present embodiment described above, a predetermined additional element is contained in the positive electrode active material to reduce a change in volume of the positive electrode active material during charge and discharge, so that deterioration of the film formed of an inorganic solid electrolyte can be suppressed. In contrast, in a method for controlling charge and discharge of a lithium ion secondary battery as described below, deterioration of the film formed of an inorganic solid electrolyte can be suppressed by reducing a change in volume of the positive electrode active material during charge and discharge using a method different from that for the above-mentioned lithium ion secondary battery. Hereinafter, the method for controlling charge and discharge of a lithium ion secondary battery is described.

The method for controlling charge and discharge of a non-aqueous electrolyte secondary battery is now described. The non-aqueous electrolyte secondary battery to be used for performing the method for controlling charge and discharge is a lithium ion secondary battery including a positive electrode active material, the surface of which is coated with a film formed of an inorganic solid electrolyte, wherein a lithium-containing composite oxide having a spinel structure is used as the positive electrode active material. The lithium ion secondary battery to be used for performing the method for controlling charge and discharge of a lithium ion secondary battery has the same configuration as that described in the above embodiment of the lithium ion secondary battery, and therefore specific descriptions thereof are omitted.

Control means for controlling charge and discharge is connected to the lithium ion secondary battery. For example, in a charge-discharge system (also referred to as a power supply system; e.g., a charge-discharge system mounted on a hybrid car and an electric car), control means controls charge and discharge of the lithium ion secondary battery configured as an assembled battery.

Specific examples preferred as the lithium-containing composite oxide having a spinel structure are the same as those of the lithium-containing composite oxide described above, and therefore detailed descriptions thereof are omitted.

The lithium ion secondary battery to be used for performing the method for controlling charge and discharge of a lithium ion secondary battery may include a lithium-containing composite oxide having a spinel structure as a positive electrode active material, and it does not matter whether an additional element is present or absent as described in the above embodiment of the lithium ion secondary battery. Hereinafter, experiments and evaluations of battery characteristics are performed using the evaluation battery prepared as Comparative Example 1.

[Experiment: Confirmation of Change in Lattice Constant]

A predetermined number of evaluation batteries (eight evaluation batteries in the present embodiment) were provided, and the batteries were charged at a constant current with a current value of ⅕ C by an electric capacity equivalent to predetermined SOC % with respect to an initial capacity from a state after discharge, so that SOC % of the batteries were adjusted (SOC %: 0%, 25%, 50%, 60%, 70%, 80%, 90% and 100%). The operations were all performed under an environment of 25° C. After adjustment of SOC %, the battery was disassembled to take out a positive electrode, and a lattice constant of a positive electrode active material was calculated from a result of XRD measurement.

Figure 3:
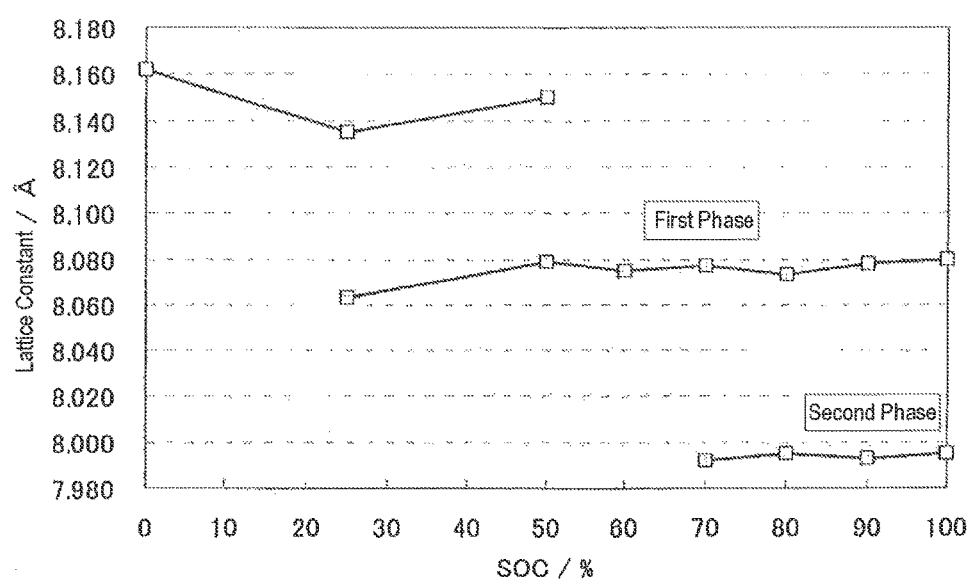
FIG. 3 shows a relationship between a lattice constant and a SOC.

The experiment results are shown in FIG. 3. In FIG. 3, the abscissa represents SOC [%], and the ordinate represents a lattice constant [Å]. With charge (SOC 0%→100%), two phases (first and second phases shown in FIG. 3) different in lattice constant from a phase (a phase emerging at SOC 0 to 50%) existing before charge and in an initial stage of charge emerge, and it is thus apparent that the volume of the positive electrode is changed stepwise with charge. In this experiment, the first phase starts to emerge at around SOC 25%, and the second phase starts to emerge at around SOC 70%.

[Evaluation of Cycle Characteristics (Cycle Test)]

The battery was charged to 3.5 V at a constant current with a current density of 2 C to a capacity equivalent to predetermined SOC % and then discharged to 3.5 V with the same current density at an environment temperature of 60° C. With this charge-discharge cycle defined as one cycle, 200 cycles were conducted. Thereafter, a discharge capacity was measured in the same manner as in the case of the initial capacity, and the measured discharge capacity was defined as a discharge capacity after cycles. The discharge capacity after cycles was divided by the initial capacity to calculate a capacity retention rate [%].

Next, using the above-mentioned evaluation battery, cycle tests were conducted while conditions of the upper limit value of SOC used were changed.

COMPARATIVE EXAMPLE 1

A cycle test was conducted with the upper limit value of SOC used set to 100% in the above-mentioned evaluation battery.

COMPARATIVE EXAMPLES 2 to 4 and EXAMPLES 1 and 2

Using the above-mentioned evaluation battery, cycle tests were conducted while only the upper limit value of SOC used was changed. That is, cycle tests were conducted with the upper limit value of SOC used set to 90% (Comparative Example 2), 80% (Comparative Example 3), 70% (Comparative Example 4), 60% (Example 1), and 50% (Example 2).

A summary of cycle characteristics in Comparative Examples 1 to 4 and Examples 1 and 2 is shown in Table 3.

Hereinafter, the upper limit value of SOC used is referred to as "use upper limit SOC".

TABLE 3

Summary of Results of Cycle Characteristics

| Experiment level | Use upper limit SOC | Cycle capacity retention rate |
| --- | --- | --- |
| Comparative Example 1 | 100% | 10.0% |
| Comparative Example 2 | 90% | 10.8% |
| Comparative Example 3 | 80% | 11.4% |
| Comparative Example 4 | 70% | 12.3% |
| Example 1 | 60% | 36.4% |
| Example 2 | 50% | 38.9% |

(Relationship Between Use Upper Limit SOC and Cycle Characteristics)

In a region of use upper limit SOC (70 to 100%) which corresponds to Comparative Examples 1 to 4, in addition to first phases emerging as almost the same lattice constant, second phases having almost the same lattice constant and each having a lattice constant smaller than that of the first phase emerge, and it is thus apparent that the volume changes during charge and discharge in Comparative Examples 1 to 4 are almost the same as shown in FIG. 3. On the other hand, in a region of use upper limit SOC (50 to 60%) which corresponds to Examples 1 and 2, only the first phase emerges, and it is thus apparent that in Examples 1 and 2, the volume change is small as compared to Comparative Examples 1 to 4.

Comparison of cycle characteristics in Comparative Examples 1 to 4 and Examples 1 and 2 shows that Comparative Examples 1 to 4 in which the volume change during charge and discharge is large have a capacity retention rate of approximately 10 to 12%, whereas Examples 1 and 2 in which the volume change is small has a significantly improved capacity retention rate of approximately 36 to 39%. This is thought to be because due to a decrease in volume change with charge and discharge, peeling and rupture of a film on the surface of a positive electrode active material is suppressed, so that durability is significantly improved. From these results, a region of use upper limit SOC which is suitable for the method for controlling charge and discharge of a lithium ion secondary battery is a SOC region from SOC 0% to a change at the first phase as shown in FIG. 3 (in FIG. 3, from SOC 0% to less than 70% because the second phase emerges at SOC 70%). Thus, peeling and rupture of the film can be suppressed by restricting the SOC region within a change in lattice constant at the first phase. Accordingly, for example, when the control means controls each lithium ion secondary battery configured as an assembled battery in a charge and discharge system so that the battery is charged and discharged in a SOC region where a SOC region involved in charge and discharge is within a change at the first phase, good cycle characteristics are obtained. Further, when the control means is combined with the above-mentioned method for containing a predetermined additional element in a positive electrode active material, a synergistic effect of further reducing a volume change of the positive electrode active material during charge and discharge can be expected.

In the prior art relating to a method for controlling charge and discharge of a lithium ion secondary battery, there is a method for reducing use upper limit SOC in order to improve cycle characteristics of a battery including a positive electrode material having a layered structure rather than a spinel structure. This is an effect by suppressing a decrease in upper limit voltage of the battery and structural degradation resulting from a change in volume of the positive electrode with charge and discharge. In such a material system having a layered structure, there is a linear relationship between a change in SOC and a change in lattice constant, and therefore cycle characteristics can be expected to be improved by only slightly reducing use upper limit SOC.

However, the method for controlling charge and discharge according to the present invention is characterized in that the method is performed in a lithium ion secondary battery including a positive electrode active material in which a change in lattice constant with charge is stepwise. Specifically, in the positive electrode active material for use in the present invention, the relationship between a change in SOC and a change in lattice constant is not linear, and there is almost no voltage change with respect to a change in SOC, so that an effect of the above described prior art cannot be simply obtained. The method for controlling charge and discharge according to the present invention is characterized in that rather than reducing what is called a cell voltage as in the prior art, a lithium ion secondary battery including a positive electrode active material, the surface of which is coated with a film formed of an inorganic solid electrolyte, is used, and control is performed so as to have use upper limit SOC suitable to cycle characteristics, thereby suppressing a volume change with charge in the battery.

In the method for controlling charge and discharge according to the present invention, in a lithium-containing composite oxide having a spinel structure (e.g., $LiNi_{0.5}Mn_{1.5}O_4$), the surface of which is at least partially coated with a film formed of an inorganic solid electrolyte, the range of use upper limit SOC is limited so that of two different phases generated in response to charge, the second phase is not generated, whereby a change in volume of a positive electrode with charge and discharge can be suppressed to prevent peeling and rupture of a film which results from the volume change. The film with which the surface of the positive electrode active material is coated is hereby prevented from losing a function as a coating layer to suppress oxidation and decomposition of an electrolyte, so that a lithium ion secondary battery excellent in durability can be provided.

INDUSTRIAL APPLICABILITY

The present invention can be applied to a non-aqueous electrolyte secondary battery.

The invention claimed is:

1. A non-aqueous electrolyte secondary battery comprising a non-aqueous electrolyte solution and a positive electrode provided with a positive electrode mixture layer, wherein
    the positive electrode mixture layer includes positive electrode active material particles,
    a surface of each of the positive electrode active material particles is coated with a film formed of an inorganic solid electrolyte, and
    a positive electrode active material of the positive electrode active material particles is a lithium-containing composite oxide having a spinel structure, is represented by the compositional formula: $LiNi_{0.5}Mn_{1.5}O_4$, performs charge and discharge at an electric potential of 4.5 V or more with respect to the lithium metal, and contains at least one of Ti and Mg as a dopant.

2. The non-aqueous electrolyte secondary battery according to claim 1, wherein the dopant is Ti.

* * * * *